(12) United States Patent
Voigtmann

(10) Patent No.: US 8,157,941 B2
(45) Date of Patent: Apr. 17, 2012

(54) PROCESS FOR THE INTERNAL WELDING OF PLASTIC TUBES

(75) Inventor: Jean-Pierre Voigtmann, Muraz (CH)

(73) Assignee: Aisapack Holding S.A., Vouvry (CH)

( * ) Notice: Subject to any disclaimer, the term of this patent is extended or adjusted under 35 U.S.C. 154(b) by 39 days.

(21) Appl. No.: 12/442,449

(22) PCT Filed: Sep. 21, 2007

(86) PCT No.: PCT/IB2007/053842
§ 371 (c)(1),
(2), (4) Date: Jul. 7, 2009

(87) PCT Pub. No.: WO2008/038206
PCT Pub. Date: Apr. 3, 2008

(65) Prior Publication Data
US 2010/0000674 A1    Jan. 7, 2010

(30) Foreign Application Priority Data
Sep. 28, 2006   (EP) .................................. 06121466

(51) Int. Cl.
*B29C 53/50*   (2006.01)
(52) U.S. Cl. ............. 156/203; 156/244.13; 156/304.2; 156/304.6
(58) Field of Classification Search ............. 156/304.1, 156/304.2, 304.3, 304.6, 217, 218, 203, 466
See application file for complete search history.

(56) References Cited

U.S. PATENT DOCUMENTS
| 3,066,063 A | 11/1962 | Ecklund et al. |
| 3,207,651 A * | 9/1965 | Hood et al. ................... 156/466 |
| 3,916,598 A * | 11/1975 | Adams et al. ................... 53/55 |
| 4,563,231 A * | 1/1986 | Porrmann et al. ............. 156/90 |
| 4,690,668 A | 9/1987 | Rebmann et al. |
| 4,746,391 A | 5/1988 | Heyse et al. |
| 2007/0079924 A1* | 4/2007 | Saadat et al. ................... 156/218 |

FOREIGN PATENT DOCUMENTS
| DE | 2008085 | 9/1971 |
| EP | 0 177 470 | 4/1986 |
| EP | 0 218 102 | 4/1987 |
| EP | 0 224 808 | 6/1987 |
| JP | 2004-050760 | 9/2005 |

OTHER PUBLICATIONS

International Search Report for PCT/IB2007/053842, mailed Apr. 11, 2008.
Written Opinion of the International Searching Authority for PCT/IB2007/053842, mailed Apr. 11, 2008.
English Translation of the Written Opinion (IPRP Chapter I) for PCT/IB2007/053842, mailed Apr. 11, 2008.

* cited by examiner

*Primary Examiner* — John L. Goff
*Assistant Examiner* — Barbara J. Musser
(74) *Attorney, Agent, or Firm* — Nixon & Vanderhye P.C.

(57) ABSTRACT

The invention relates to a process for manufacturing plastic packaging in tubular form, which process comprises a wrapping step during which a laminate (11) is wrapped, an abutting step during which the edges (8, 9) of the laminate (11) are butted together and a fastening step during which said edges (8, 9) of the laminate (11) are welded together, characterized in that a bead (12) of plastic in the molten state is extruded and deposited on the internal face of the packaging so as to cover at least the weld zone (10) defined between the edges. The energy needed to produce the weld (10) comes from the plastic bead (12).
The invention also relates to packaging obtained from the aforementioned process and to a device for implementing said process.

3 Claims, 6 Drawing Sheets

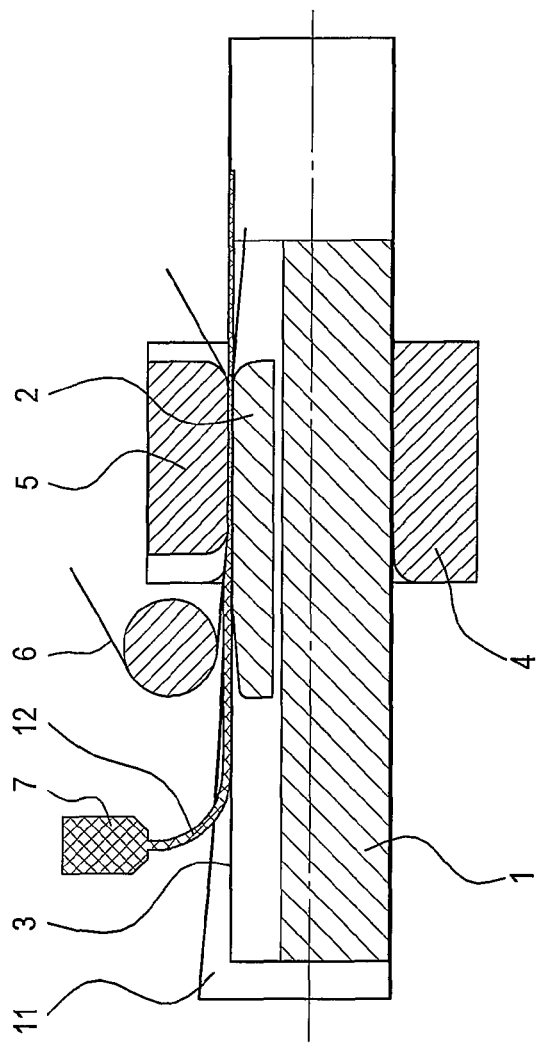
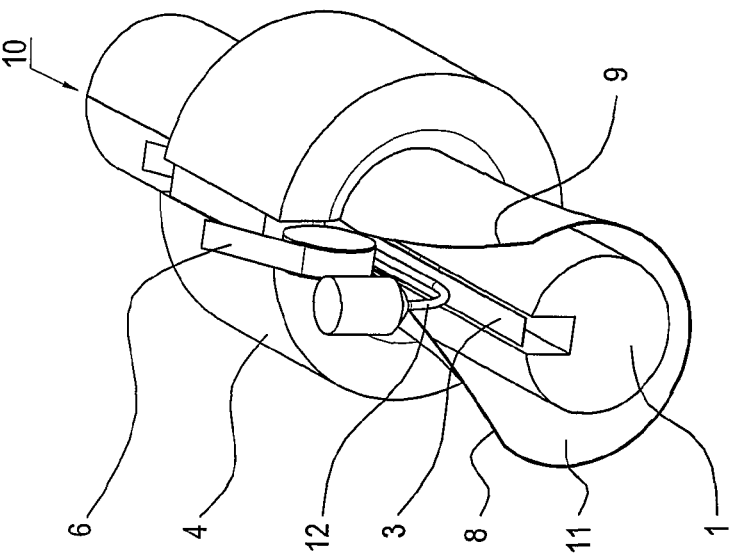

PROCESS FOR THE INTERNAL WELDING OF PLASTIC TUBES

This application is the U.S. national phase of International Application No. PCT/IB2007/053842, filed 21 Sep. 2007, which designated the U.S. and claims priority to EP Application No. 06121466.4, filed 28 Sep. 2006, the entire contents of each of which are hereby incorporated by reference.

FIELD OF THE INVENTION

The invention relates to the field of tubular packaging, especially consisting of a wrapped plastic laminate. More precisely, the invention relates to wrapped laminates, the edges of which do not overlap.

PRIOR ART

The welding of the edges of a laminate so as to obtain a tubular body usually takes place with an overlap. See for example German Patent Application DE 2008085.

When it is desired to place the edges face to face, a gap is left between them which is filled with a material, such as a strip of plastic, the strip acting as a welding element. See for this purpose European Patent Application EP 0 000 643.

However, there is a need to bring the edges into direct contact with each other (butt welding), for technical and aesthetic reasons. Butt welding provides better continuity and homogeneity of the material constituting the wall of the packaging. In particular, it avoids contact between the product placed inside the tube with a barrier layer placed inside the laminate. Moreover, the absence of a welding element on the external face reduces the visibility of the weld zone.

Moreover, whether the edges are placed end to end with or without a gap containing a welding element, there is also a need to be able to reduce, if not eliminate, the visibility of the weld from the outside of the tube.

The heating systems of the prior art are placed on the outside of the tube and their activation necessarily results in a pronounced and matt weld zone.

GENERAL DESCRIPTION OF THE INVENTION

The problem the present invention proposes to solve lies in the weakness of a butt weld and the maintaining of an attractive weld, i.e. one which is unnoticeable or almost unnoticeable when observed from the outside.

In the invention, the solution to the aforementioned problem consists in reinforcing such a weld by means of a bead of plastic.

The invention relates in the first place to a process for manufacturing plastic packaging in tubular form, which process comprises a wrapping step during which a laminate is wrapped, an abutting step during which the edges of the laminate are butted together and a fastening step during which said edges of the laminate are fastened together, characterized in that a bead of plastic in the molten state is extruded and deposited on the internal face of the packaging so as to cover at least the zone defined between the edges. One feature of the invention lies in the fact that the energy needed to produce the weld comes from the plastic bead.

According to a first variant of the process according to the invention, the bead is deposited prior to the abutting step.

According to a second variant, the bead is deposited during the abutting step.

According to a third variant, the bead is deposited after the abutting step.

The bead may be placed beneath or above the weld zone.

The invention also relates to tubular packaging obtained by the process as defined above, the packaging being characterized in that it comprises an element for reinforcing the zone defined between the edges, which consists of an extruded bead of plastic in the molten state.

Finally, the invention relates to a device for implementing a process as defined above. The device is characterized in that it includes a welding rod designed to be surrounded by a laminate, characterized in that it includes means for extruding and placing a bead of plastic in the molten state between the external surface of the welding rod and a laminate placed around said rod.

In one embodiment of the invention, the device includes a preheated conveyor belt placed on the welding rod so that said bead is placed between said belt and a laminate wrapped around said rod.

In another embodiment of the invention, the device includes an external drive belt and an adjustable bearing block that are placed so as to exert, in the direction of said rod, pressure on a laminate and a bead of plastic which would be placed between said drive belt and said rod.

Advantageously, a device may be used for preheating the edges, for example by contact, having the effect of increasing the temperature of the two edges of the laminate, thus facilitating or improving the welding conditions.

Alternatively, or in addition, another device is used which is provided with a hot-air blower so as to maintain the ambient air around the bead at a temperature of several hundred ° C. and consequently to avoid a drop in temperature of the bead as it passes from the exit of the extrusion head to the point where the bead is shaped.

According to one variant of the invention, the edges of the laminate are cut obliquely, this having the effect of increasing the lateral contact area of the laminate in the weld zone. Such a configuration also enables the quality and the strength of the weld to be influenced.

In another variant of the invention, a bead is extruded with a shape other than a cylinder, for example in the shape of an upside down T, thereby facilitating the shaping of the bead during welding.

Another variant of the invention consists in using a bead of coextruded plastic (coextruded with a barrier material at the centre of the bead) so as to also guarantee, in the zone defined between the edges of the laminate, good barrier protection from the external environment of the tube.

The present invention has several advantages, in particular:
 a complex high-frequency welding system is no longer necessary, the energy needed to produce the weld comes from the bead of plastic;
 the external appearance of the tube is perfect, given that the energy for producing the weld is applied from the inside. With the systems of the prior art, the energy is applied from the outside, the weld being matt and pronounced; and
 substantial covering layer (bead) made of PE or PP (or other materials) inside the tube along the join between the two edges of the laminate, preventing any contact between the product in the tube and the barrier layer (e.g. aluminum) of the laminate.

DETAILED DESCRIPTION OF THE INVENTION

The invention will be described in greater detail below by means of examples illustrated by the following figures:

FIG. 3 is a perspective view of a second device according to the invention;

FIG. 4 is a lateral section of the device of FIG. 3;

Figure 1:
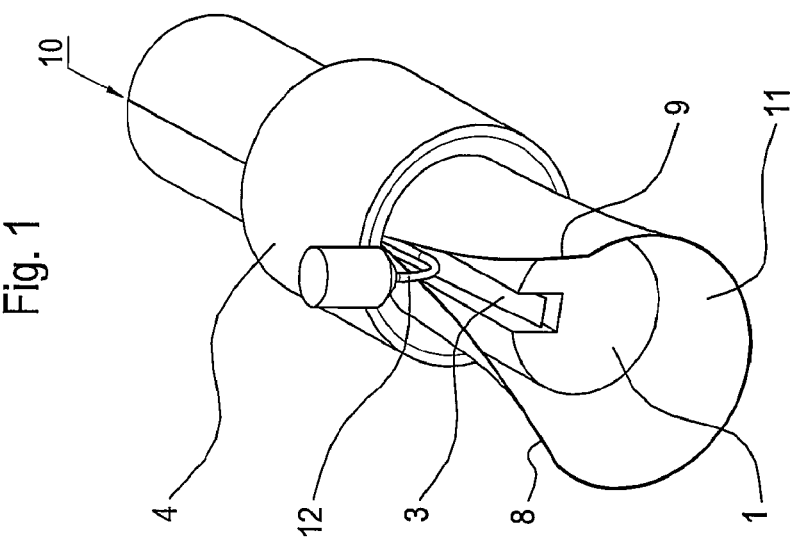
FIG. 1 is a perspective view of a first device according to the invention.

LIST OF THE NUMERICAL REFERENCES USED IN THE FIGURES 1. welding rod
2. Sizing die (height adjustable)
3. Internal belt (metallic)
4. Forming die
5. Bearing block
6. External belt
7. Extrusion head
8. First laminate edge
9. Second laminate edge
10. Weld zone
11. Laminate (continuous strip)
12. Bead of extruded plastic
13. Barrier layer
14. Gap
15. Compression wheel
16. Bead of coextruded plastic (coextruded with a barrier material at the centre of the bead).

The tube is formed continuously by progressively wrapping a strip of laminate 11 around the entire circumference of the welding rod 1, the laminate being pulled (from left to right in the figures) through the forming die 4. The laminate 11 made of PE or PP (or other materials) (whether a monolayer or a multilayer) is then welded longitudinally by depositing a bead 12 of extruded plastic in the molten state inside the tube.

Figure 12:
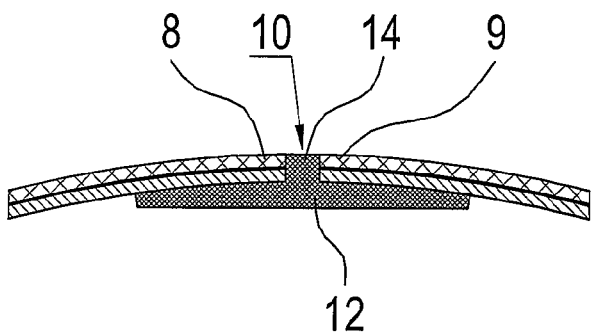
FIG. 12 shows a second variant of a weld according to the invention.
Figure 13:
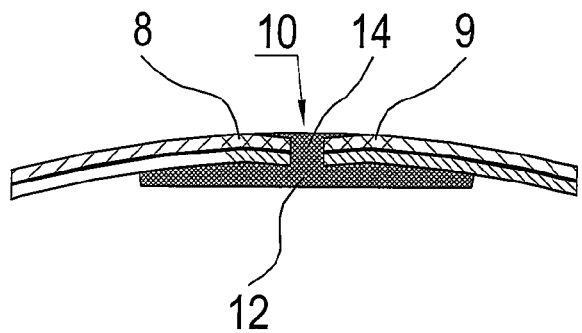
FIG. 13 shows a third variant of a weld according to the invention.
Figure 14:
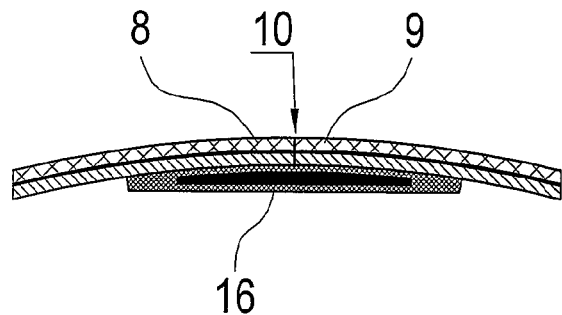
FIG. 14 shows a fourth variant of a weld according to the invention.

Depending on the width of the laminate 11, it is possible to adjust the gap 14 between the edges 8, 9 of the laminate 11 formed on the final diameter of the tube. The bead 12 deposited inside may thus fill this gap 14 (FIG. 12) and also weld the outer layer of the laminate 11, e.g. a multilayer laminate that contains a barrier layer 13. If necessary, the weld 12 may even partly cover an external portion of the edges 8, 9 of the laminate 11 (FIG. 13). The use of a bead 12 of coextruded plastic in the molten state (coextruded with a barrier material 16 at the centre of the bead) also makes it possible to ensure that there is good barrier protection in the gap 14 from the external environment of the tube (FIG. 14). For aesthetic reasons, it is preferred to minimize this gap 14.

Figure 2:
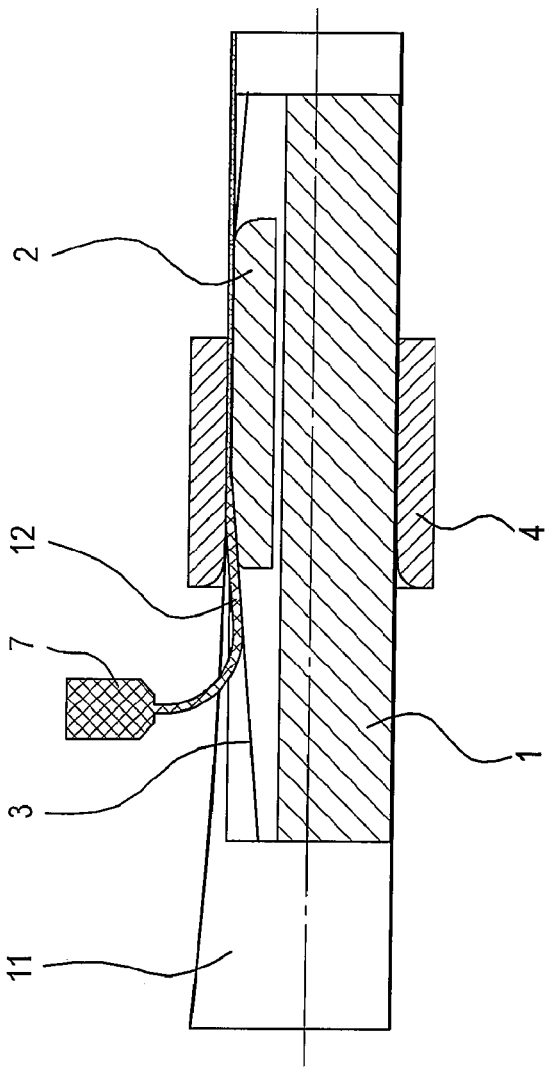
FIG. 2 is a lateral section of the device of FIG. 1.

1st Variant:

FIGS. 1 and 2 illustrate the introduction of the bead 12, extruded in the molten state, by means of a preheated conveyor belt 3 onto a height-adjustable sizing die 2 after the cross section of the tube has been definitively formed by the laminate 11 in a die 4. The weld bead 12 is firstly applied against the inside of the preformed tube. The weld is then sized to the desired dimensions (top welding).

2nd Variant:

FIGS. 3 and 4 show the engagement of a bead 12, extruded in the molten state, by means of a preheated conveyor belt 3 onto a height-adjustable sizing die 2 before the cross section of the tube has been definitively formed by the laminate 11 in the die 4. Thus, the edges 8, 9 of the laminate 11, in its final shaping phase, are applied and pressed against the prepositioned bead 12 by means of an external drive belt 6 and an adjustable bearing block 5. The weld is therefore sized by prepositioning the bead 12, but in particular by the height adjustment of the bearing block 5.

Figure 5:
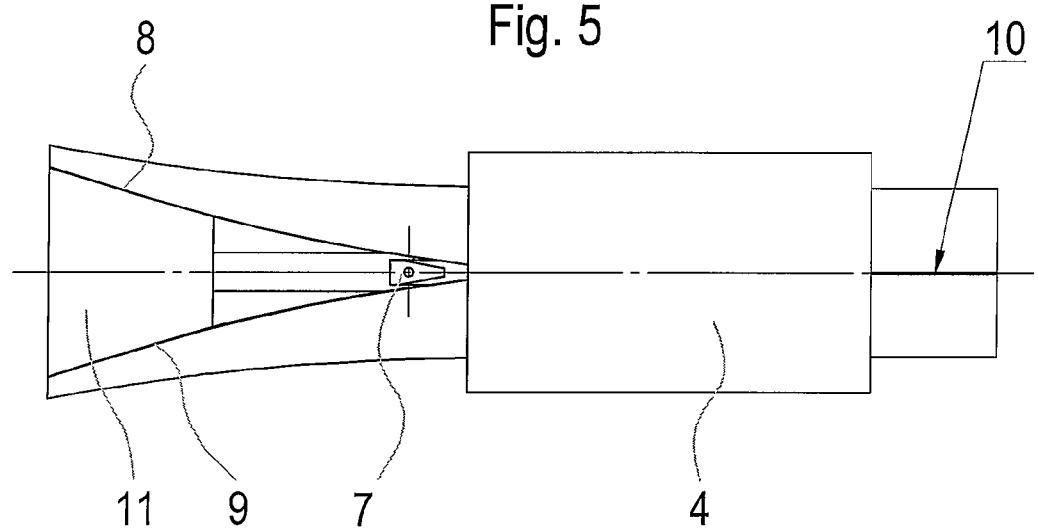
FIG. 5 is a perspective view of a third device according to the invention.
Figure 6:
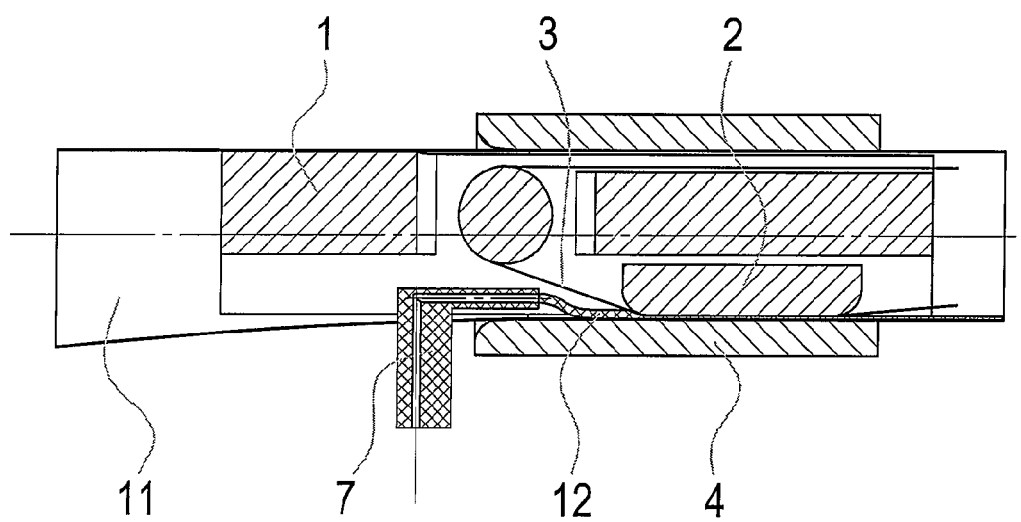
FIG. 6 is a lateral section of the device of FIG. 5.

3rd Variant:

FIGS. 5 and 6 show a similar principle, but reversed, this time with the welding from below. The bead 12, extruded in the molten state, is deposited directly inside the tube after its circular cross section has been definitively formed by the laminate 11 in the die 4. The weld is then pressed and sized by means of the internal belt 3 and the height-adjustable sizing die 2. In this variant, all the energy coming from the bead 12, needed to produce the weld, is transmitted directly to the laminate 11, thus minimizing energy losses by contact, for example, with the internal belt 3.

Figure 8:
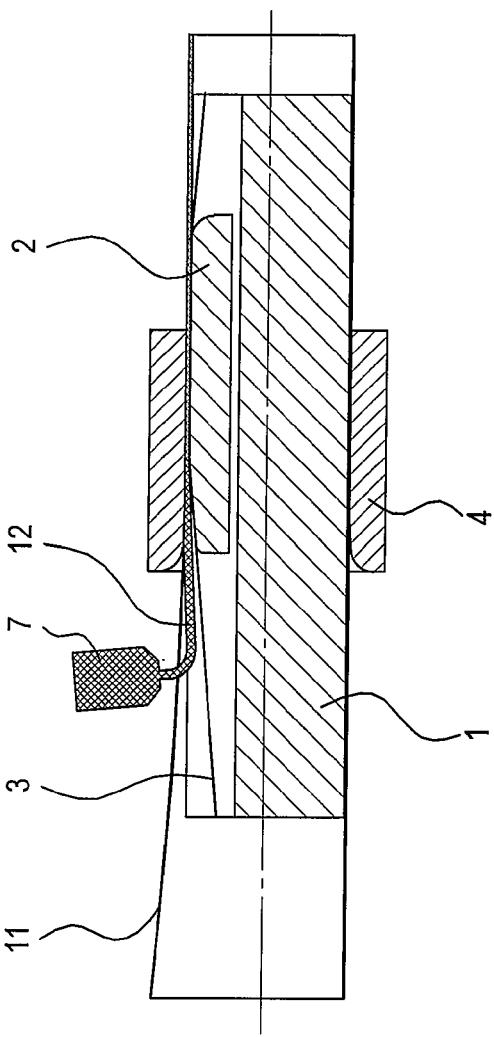
FIG. 8 is a lateral section of the device of FIG. 7.
Figure 7:
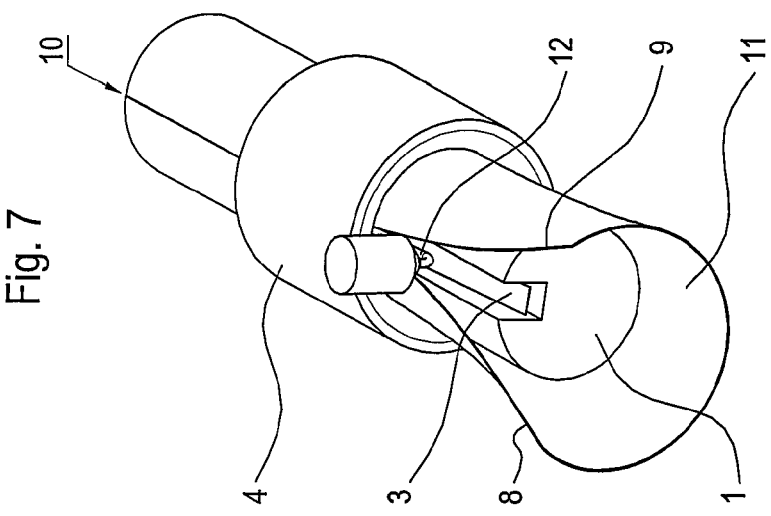
FIG. 7 is a perspective view of a fourth device according to the invention.

4th Variant:

FIGS. 7 and 8 show the engagement of the bead 12, extruded in the molten state, but tensioned, avoiding the bead being deposited on the conveyor belt 3. The energy losses are thus minimized as contact with the conveyor belt 3 is delayed as long as possible and takes place at the same time as the operation of shaping and compressing the bead 12.

Figure 10:
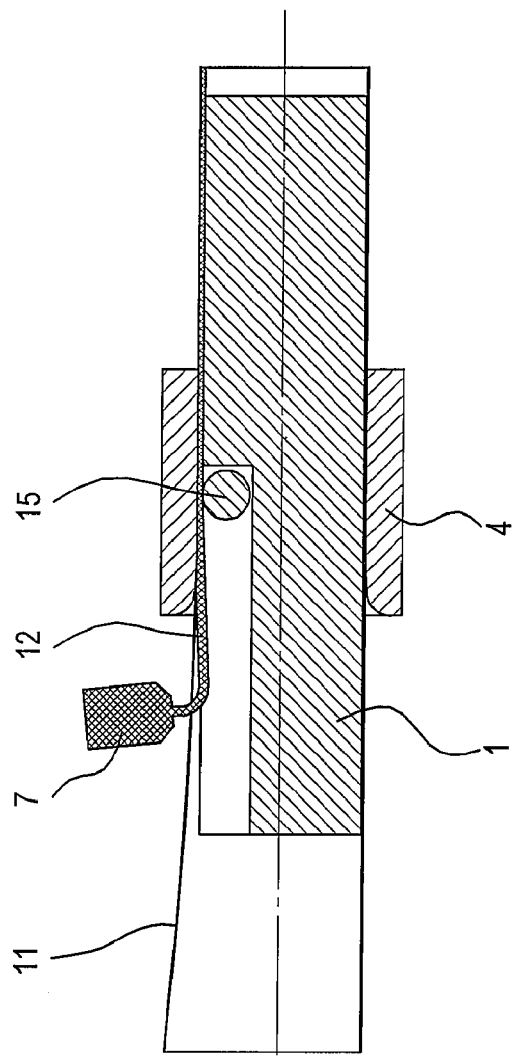
FIG. 10 is a lateral section of the device of FIG. 9.
Figure 9:
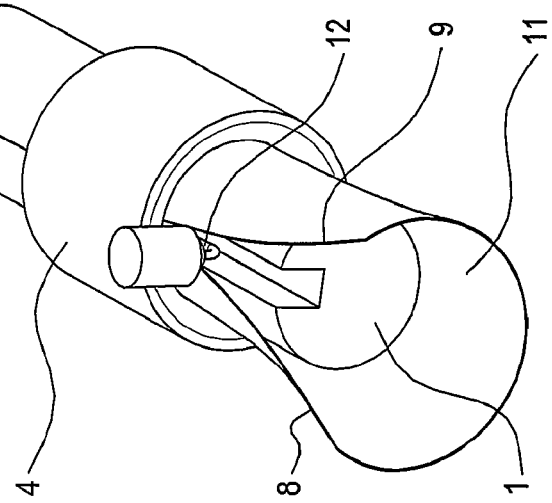
FIG. 9 is a perspective view of a fifth device according to the invention.
Figure 11:
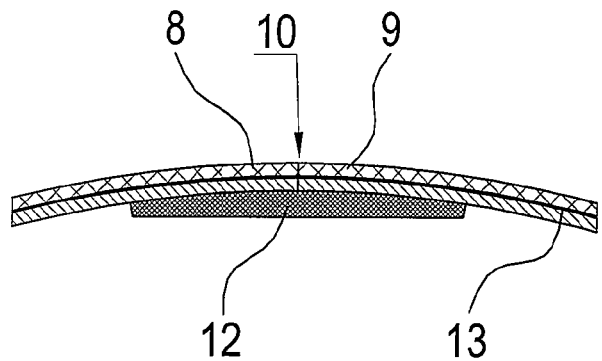
FIG. 11 shows a first variant of a weld according to the invention.

5th Variant:

FIGS. 9 and 10 show the engagement of the bead 12, extruded in the molten state, but tensioned, the bead 12 being directly driven by the laminate 11 and no longer requiring a conveyor belt. The weld is then pressed and sized by a compression wheel 15 or, alternatively, by a compression block 2 (not illustrated).

Of course, the invention is not limited to the aforementioned examples.

The invention claimed is:

1. Process for manufacturing plastic packaging in tubular form, said process comprising:
    a wrapping step during which a laminate, having edges, is wrapped, an abutting step during which the edges of the laminate are butted together, and
    a fastening step during which said edges of the laminate are welded together,
    wherein a bead of plastic in a molten state is extruded and deposited on an internal face of the laminate so as to cover at least a weld zone defined between the edges, the energy needed to produce the weld coming from the plastic bead, and
    wherein the bead of plastic is extruded in the molten state onto a conveyor belt, and the molten bead of plastic contacts the internal face of the laminate prior to the abutting step.

2. Process according to claim 1, wherein the bead is placed in the molten state beneath said weld zone.

3. Process according to claim 1, wherein the bead consists of a plastic coextruded with a barrier material at the centre of the bead.

* * * * *